(12) United States Patent
Ohashi

(10) Patent No.: US 10,084,936 B2
(45) Date of Patent: Sep. 25, 2018

(54) DISPLAY SYSTEM INCLUDING AN IMAGE FORMING APPARATUS AND A DISPLAY APPARATUS

(71) Applicant: KYOCERA Document Solutions Inc., Osaka (JP)

(72) Inventor: Akira Ohashi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/788,342

(22) Filed: Oct. 19, 2017

(65) Prior Publication Data

US 2018/0115681 A1    Apr. 26, 2018

(30) Foreign Application Priority Data

Oct. 21, 2016  (JP) .................. 2016-207146

(51) Int. Cl.
| | |
|---|---|
| H04N 1/387 | (2006.01) |
| G06T 19/20 | (2011.01) |
| G09G 5/00 | (2006.01) |
| H04N 1/00 | (2006.01) |
| H04N 1/32 | (2006.01) |
| G09G 3/00 | (2006.01) |
| G09G 5/393 | (2006.01) |

(52) U.S. Cl.
CPC .......... *H04N 1/3876* (2013.01); *G06T 19/20* (2013.01); *G09G 3/002* (2013.01); *G09G 5/006* (2013.01); *G09G 5/393* (2013.01); *H04N 1/00137* (2013.01); *H04N 1/00167* (2013.01); *H04N 1/00246* (2013.01); *H04N 1/32133* (2013.01); *G06T 2215/16* (2013.01); *G06T 2219/004* (2013.01); *G09G 2370/022* (2013.01); *G09G 2370/042* (2013.01); *H04N 2201/0094* (2013.01); *H04N 2201/3205* (2013.01); *H04N 2201/325* (2013.01); *H04N 2201/3273* (2013.01)

(58) Field of Classification Search
None
See application file for complete search history.

(56) References Cited

U.S. PATENT DOCUMENTS

| | | | | |
|---|---|---|---|---|
| 2007/0132662 | A1* | 6/2007 | Morita | G06F 3/014 345/8 |
| 2015/0317040 | A1* | 11/2015 | Vesco | A63F 13/60 715/823 |
| 2016/0378725 | A1* | 12/2016 | Marchsreiter | G06F 17/2229 715/255 |

FOREIGN PATENT DOCUMENTS

JP    2016-81313    5/2016

* cited by examiner

*Primary Examiner* — Andrew H Lam
(74) *Attorney, Agent, or Firm* — Wenderoth, Lind & Ponack, L.L.P.

(57) ABSTRACT

A display system includes a storage apparatus, an image forming apparatus, and a display apparatus. The display apparatus accepts editing of a virtual reality space, and the image forming apparatus generates edited display data for displaying a virtual reality space reflecting editing content, and correlates the edited display data with data identification information to cause the storage apparatus to store the edited display data. When the data identification information is inputted, the image forming apparatus acquires edited display data corresponding to the data identification information and transmits the edited display data to the display apparatus, thereby causing the display apparatus to display a virtual reality space based on the edited display data.

5 Claims, 8 Drawing Sheets

Editing operation

DISPLAY SYSTEM INCLUDING AN IMAGE FORMING APPARATUS AND A DISPLAY APPARATUS

CROSS-REFERENCE TO RELATED APPLICATION

This application is based upon and claims the benefit of priority from Japanese Patent Application No. 2016-207146 filed on Oct. 21, 2016, the entire contents of which are incorporated herein by reference.

BACKGROUND

The technology of the present disclosure relates to a display system including an image forming apparatus and a display apparatus.

In the related art, there has been known a display system using virtual reality (VR) or augmented reality (AR). Such a display system, for example, includes an image forming apparatus and a display apparatus. The image forming apparatus is a multifunctional peripheral having an image processing function and various processes for display are performed by the image forming apparatus. As the display apparatus, a smart phone or a head mounted display is used.

SUMMARY

A display system according to one aspect of the present disclosure includes a storage apparatus, an image forming apparatus, and a display apparatus. The storage apparatus stores basic data for displaying a virtual reality space and stores object data for displaying an object in the virtual reality space. The image forming apparatus performs a combination process for combining the basic data and the object data with each other, thereby generating display data for displaying the virtual reality space where the object is arranged. The display apparatus receives the display data transmitted from the image forming apparatus and displays the virtual reality space based on the display data. When the virtual reality space is displayed, the display apparatus accepts editing of the virtual reality space being currently displayed and transmits editing content information indicating the accepted editing content to the image forming apparatus. Furthermore, the image forming apparatus recognizes the editing content on a basis of the editing content information, generates edited display data being the display data for displaying the virtual reality space reflecting the editing content, transmits the edited display data to the display apparatus to cause the display apparatus to display the virtual reality space based on the edited display data, and correlates the edited display data with data identification information for identifying the edited display data to cause the storage apparatus to store the edited display data. When the data identification information is inputted to the image forming apparatus, the image forming apparatus acquires the edited display data corresponding to the data identification information from the storage apparatus, and transmits the edited display data to the display apparatus to cause the display apparatus to display the virtual reality space based on the edited display data.

A display system according to another aspect of the present disclosure includes a storage apparatus, an image forming apparatus, and a display apparatus. The storage apparatus stores basic data for displaying a virtual reality space and stores object data for displaying an object in the virtual reality space. The image forming apparatus performs a combination process for combining the basic data and the object data with each other, thereby generating display data for displaying the virtual reality space where the object is arranged. The display apparatus receives the display data transmitted from the image forming apparatus and displays the virtual reality space based on the display data. The image forming apparatus performs a process for partially and sequentially generating the display data as the combination process and stepwisely transmits a completely generated data part of the display data to the display apparatus, thereby causing the display apparatus to perform a process for stepwisely displaying a part of the virtual reality space, in which generation of the display data has been completed.

DETAILED DESCRIPTION

<Configuration of Display System>

Figure 1:
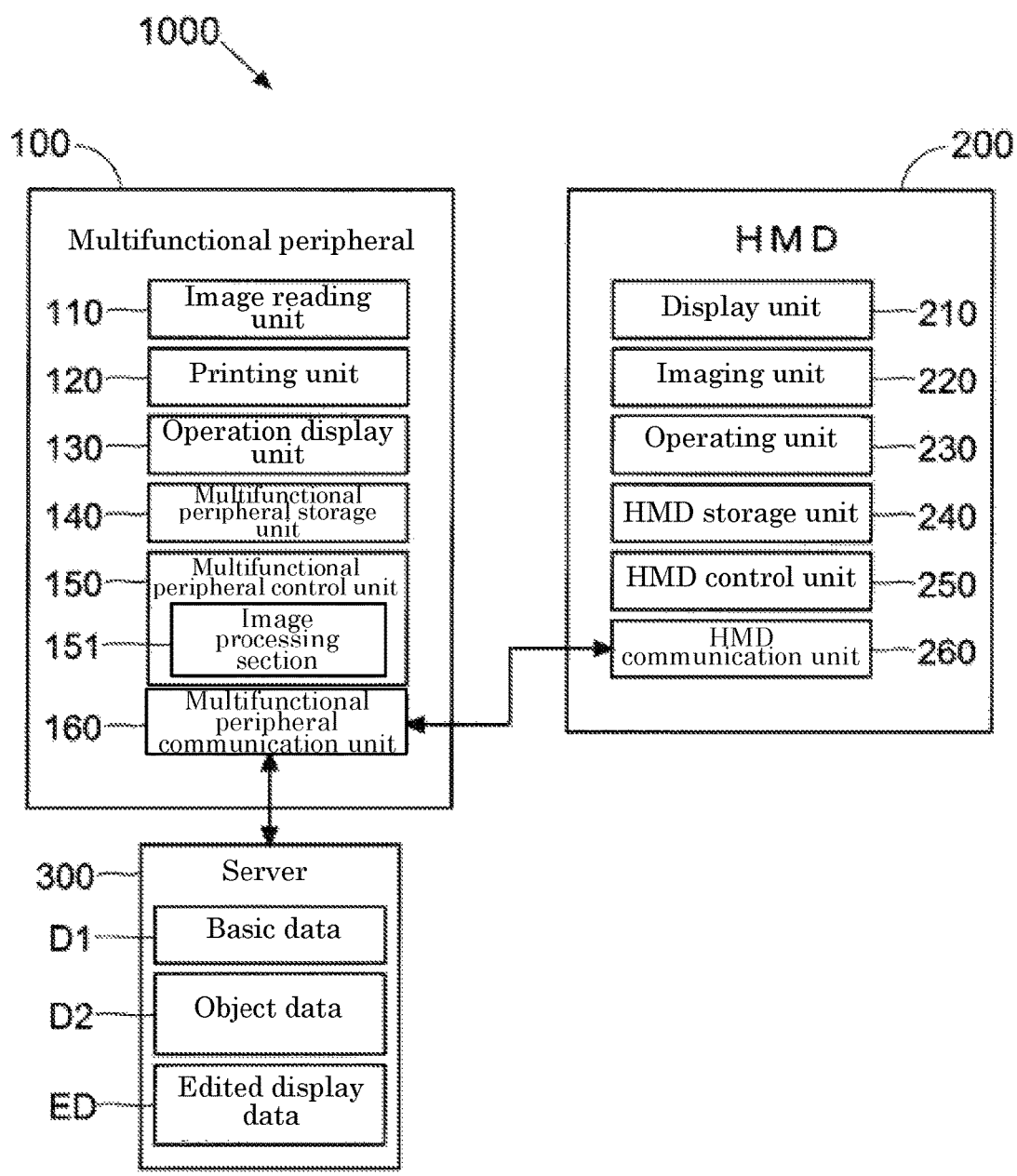
FIG. 1 is a diagram illustrating a configuration of a display system according to an embodiment.

As illustrated in FIG. 1, a display system 1000 of the present embodiment is a system for displaying a virtual reality space, and includes a multifunctional peripheral 100, a head mounted display 200, and a server 300. The multifunctional peripheral 100 corresponds to an "image forming apparatus", the head mounted display 200 corresponds to a "display apparatus", and the server 300 corresponds to a "storage apparatus". In the following description, the head mounted display is abbreviated as HMD (Head Mounted Display).

The multifunctional peripheral 100 is communicably connected to the HMD 200. Furthermore, the multifunctional peripheral 100 is communicably connected to the server 300. In addition, the multifunctional peripheral 100 may be communicably connected to the HMD 200 and the server 300.

The multifunctional peripheral 100 is an image forming apparatus having a scan function and a print function, and includes an image reading unit 110, a printing unit 120, an operation display unit 130, a multifunctional peripheral storage unit 140, a multifunctional peripheral control unit 150, and a multifunctional peripheral communication unit 160.

The image reading unit 110 reads an image of a document (a recording medium) to generate image data of the document. The printing unit 120 prints the image on a sheet (a recording medium) to output the printed sheet. The operation display unit 130 includes a touch panel display and a hardware key. The operation display unit 130 displays a screen with an arranged software key and the like on the touch panel display and accepts an operation (a touch operation for the software key and a pressing operation for the hardware key) for performing various types of setting.

The multifunctional peripheral storage unit 140 includes a ROM and a RAM and stores control programs and data. The multifunctional peripheral control unit 150 includes a processor such as a CPU and controls each element of the multifunctional peripheral 100. That is, the multifunctional peripheral control unit 150 controls the reading operation of the image reading unit 110 and the printing operation of the printing unit 120. Furthermore, the multifunctional peripheral control unit 150 controls the display operation of the operation display unit 130 or detects an operation for the operation display unit 130.

Furthermore, the multifunctional peripheral control unit 150 includes an image processing section 151. The image processing section 151 is configured with an image processing circuit (for example, an ASIC and the like), a memory for storing image processing programs and data, and the like. The image processing section 151 performs image processing such as expansion, reduction, and density conversion on image data. Furthermore, the image processing section 151 performs a character recognition process for recognizing characters included in the image data. In addition, in the character recognition process by the image processing section 151, an OCR technology is used for example. Moreover, the image processing section 151 performs a process for generating display data necessary for displaying a virtual reality space.

The multifunctional peripheral communication unit 160 is a communication interface for communicating with the HMD 200 and the server 300. The multifunctional peripheral control unit 150 communicates the HMD 200 and the server 300 via the multifunctional peripheral communication unit 160, thereby transmitting and receiving data.

The HMD 200 is mounted by a user. In addition, the HMD 200 is a spectacles-type display and displays a virtual reality space at a place corresponding to lenses of spectacles (displays a virtual reality space before user's eyes). This HMD 200 includes a display unit 210, an imaging unit 220, an operating unit 230, a HMD storage unit 240, a HMD control unit 250, and a HMD communication unit 260.

The display unit 210 is arranged at a position facing eyes of a user mounted with the HMD 200. The display unit 210 displays the virtual reality space. The imaging unit 220 includes a CCD camera and the like and is arranged at a position at which capturing in a visual field direction of the user mounted with the HMD 200 is possible. The operating unit 230 includes a hardware key and the like and accepts an operation (a pressing operation for the hardware key) for performing various types of setting.

The HMD storage unit 240 includes a ROM and a RAM and stores control programs and data. The HMD control unit 250 includes a processor such as a CPU and controls the display operation of the display unit 210 and the capturing operation of the imaging unit 220 on the basis of the control programs and data stored in the HMD storage unit 240.

The HMD communication unit 260 is an interface for communicating with the multifunctional peripheral 100. The HMD control unit 250 communicates with the multifunctional peripheral 100 via the HMD communication unit 260 and transmits/receives data. In addition, communication may be performed with a portable terminal (a cellular phone, a smart phone, a tablet terminal and the like) owned by a user via the HMD communication unit 260. In this case, it is possible to perform various types of setting by using the portable terminal owned by a user.

The server 300, for example, is a storage server (a cloud) on a network such as the Internet. Reading of data from the server 300 and writing of data to the server 300 are performed by the multifunctional peripheral 100. In addition, the server 300 may be omitted from the display system 1000 and the multifunctional peripheral 100 may be caused to serve as a "storage apparatus". In this case, a large capacity storage area (a HDD and the like) may be installed in the multifunctional peripheral 100.

<Display of Virtual Reality Space>

Display of a virtual reality space performed in the display system 1000 of the present embodiment will be described by exemplifying a case of displaying a virtual reality space corresponding to an actual indoor space of a building such as a house, a store, and an office building. In this case, for example, the display system 1000 is managed by a real estate agent, and a service (hereinafter, simply called a display service in some cases) for displaying a virtual reality space corresponding to an actual indoor space of a building is provided to a user who desires to confirm the indoor of the building.

Figure 2:
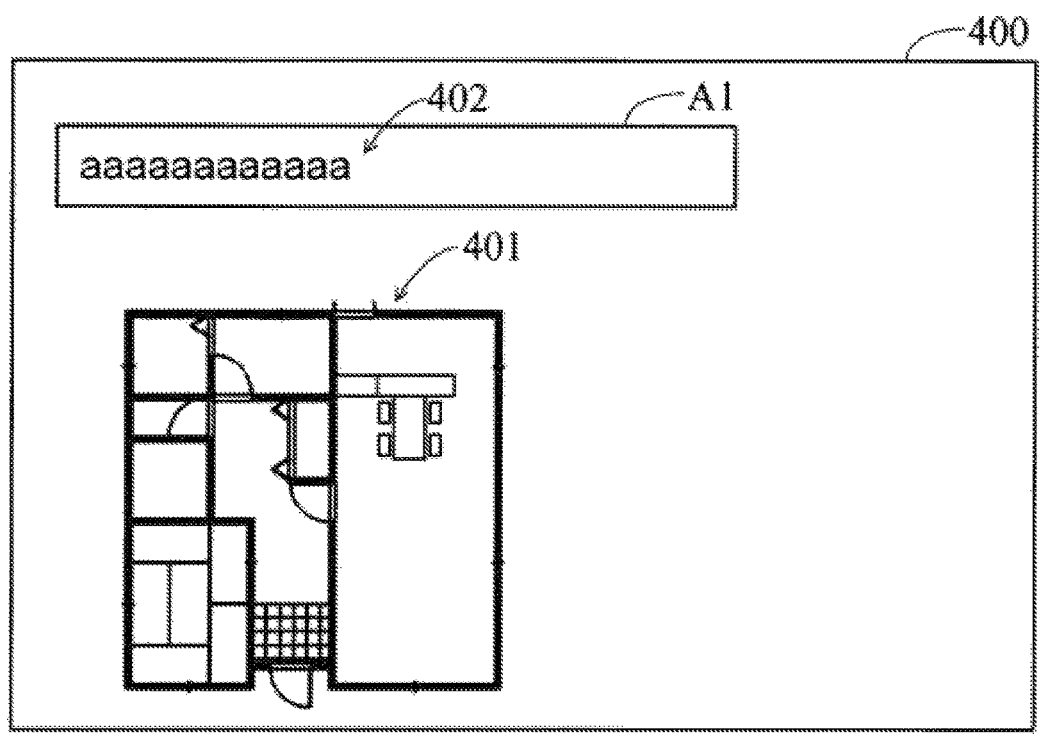
FIG. 2 is a diagram illustrating a data acquisition sheet read by an image forming apparatus of a display system according to an embodiment.

Firstly, a data acquisition sheet 400 as illustrated in FIG. 2 is prepared by a manager of the display system 1000 in advance. The data acquisition sheet 400 is a recording medium (a sheet medium) with a printed layout plan 401 indicating the size, arrangement and the like of rooms in a building. The data acquisition sheet 400 is prepared in various types, wherein layout plans 401 different from one another are respectively printed on the various types of data acquisition sheets 400.

Furthermore, an information image 402 (indicated by an enumeration of an alphabet "a" in FIG. 2 for the purpose of convenience) indicating basic identification information is printed on the various types of data acquisition sheets 400. For example, the data acquisition sheet 400 is provided with an area A1 for printing a text image indicating building information of a corresponding building (the layout plan 401). The building information indicated by the text image printed in the area A1 of the data acquisition sheet 400 is regarded as the basic identification information. Although not especially specified, a text image indicating the address and the location of a building is printed in the area A1 of the data acquisition sheet 400. In this case, the address and the location of the building are regarded as the basic identification information. In addition, the basic identification information may be a simple serial number or an enumeration of characters or figures arbitrarily set by a manager.

In this case, the server 300 stores in advance a plurality of pieces of basic data D1 (see FIG. 1) respectively correlated with a plurality of types of basic identification information (building information). The plurality of pieces of basic data D1 is data for displaying virtual reality spaces corresponding to indoor spaces of a corresponding building.

Moreover, the server 300 stores in advance a plurality of pieces of object data D2 (see FIG. 1). Each of the plurality of pieces of object data D2 is data for displaying an object in the virtual reality space. For example, the object includes furniture (for example, a table and a sofa), electrical products (for example, a television and a lighting equipment), a curtain and the like.

When the basic identification information is inputted to the multifunctional peripheral 100, the multifunctional peripheral 100 generates display data (hereinafter, referred to as basic display data) for displaying a virtual reality space, and transmits the basic display data to the HMD 200. When the basic display data is received, the HMD 200 displays a virtual reality space based on the basic display data. The displayed virtual reality space is obtained by imaging indoor spaces of a building corresponding to the basic identification information inputted to the multifunctional peripheral 100.

For example, when the display service is provided to a user, the manager of the display system 1000 causes the multifunctional peripheral 100 to read the data acquisition sheet 400 with the printed layout plan 401 desired by the user. That is, the data acquisition sheet 400 is set to the multifunctional peripheral 100, and a start operation (a pressing operation for a start key) for starting the reading of the data acquisition sheet 400 is performed for the operation display unit 130.

When the start operation for the operation display unit 130 is detected, the multifunctional peripheral control unit 150 causes the image reading unit 110 to read the data acquisition sheet 400 set to the multifunctional peripheral 100. In this way, image data of the data acquisition sheet 400 is generated. Thereafter, the multifunctional peripheral control unit 150 performs a character recognition process on the area A1 of the image data of the data acquisition sheet 400 to recognize the basic identification information, and deals the recognized basic identification information as the basic identification information inputted to the multifunctional peripheral 100.

In addition, the operation display unit 130 may accept the input of the basic identification information. That is, the basic identification information may be inputted to the multifunctional peripheral 100 via the operation display unit 130.

Figure 3:
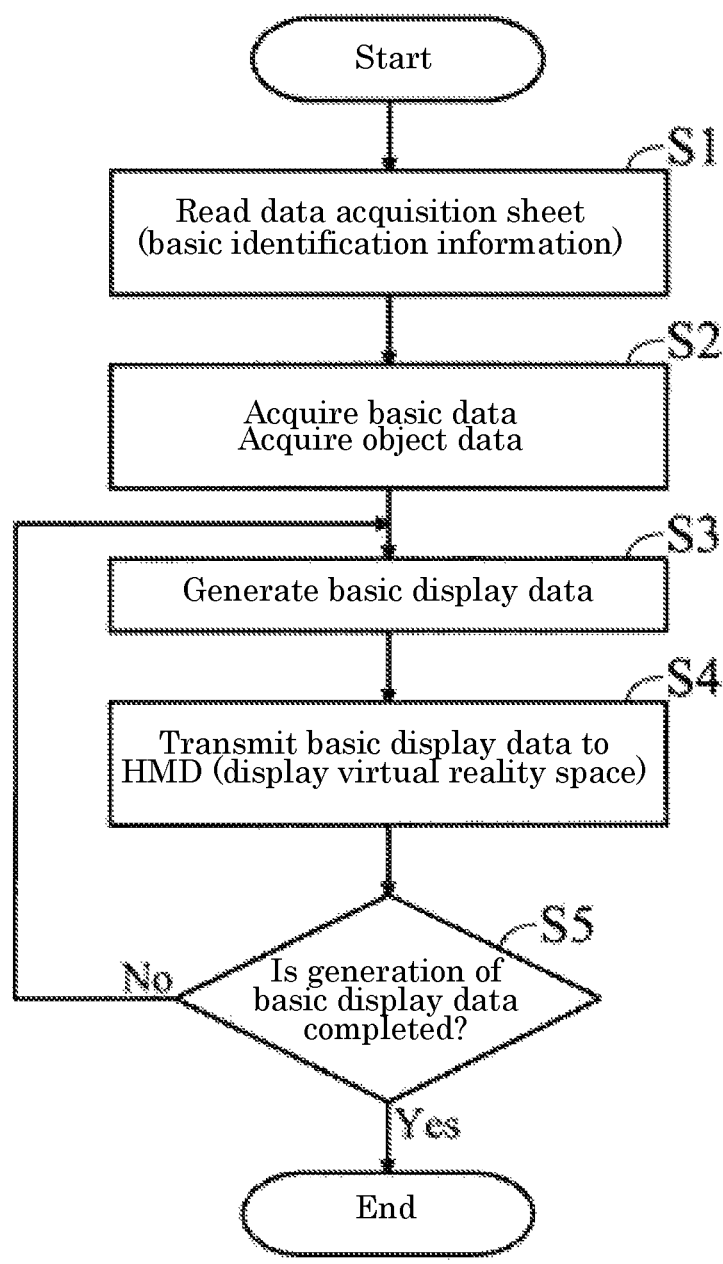
FIG. 3 is a flowchart illustrating the flow of processing when a display system according to an embodiment displays a virtual reality space based on basic display data.

Hereinafter, with reference to the flowchart of FIG. 3, the flow of processing when displaying a virtual reality space will be described. The flowchart illustrated in FIG. 3 is started when the multifunctional peripheral 100 accepts a reading start instruction of the data acquisition sheet 400.

In step S1, the multifunctional peripheral control unit 150 causes the image reading unit 110 to read the data acquisition sheet 400 (the basic identification information). Then, the multifunctional peripheral control unit 150 recognizes the basic identification information read by the image reading unit 110 as the basic identification information inputted to the multifunctional peripheral 100.

Subsequently, in step S2, the multifunctional peripheral control unit 150 acquires the basic data D1 corresponding to the basic identification information inputted to the multifunctional peripheral 100 from the server 300. Furthermore, the multifunctional peripheral control unit 150 acquires the object data D2 of a basic object, which has been predetermined as an object to be displayed in the virtual reality space corresponding to the basic data D1, from the server 300. For example, the object data D2 of the basic object includes data defining an arrangement position (a coordinate) and the like in the virtual reality space.

In step S3, the multifunctional peripheral control unit 150 performs a combination process for combining the basic data D1 and the object data D2 acquired from the server 300 with each other, thereby generating basic display data for displaying a virtual reality space where the basic object has been arranged. In step S4, the multifunctional peripheral control unit 150 transmits the basic display data to the HMD 200, thereby causing the HMD 200 to display the virtual reality space (the virtual reality space where the basic object has been arranged) based on the basic display data.

In step S3, the multifunctional peripheral control unit 150 performs a process for partially and sequentially generating the basic display data as the combination process. Furthermore, in step S4, the multifunctional peripheral control unit 150 stepwisely and sequentially transmits a completely generated data part of the basic display data to the HMD 200, thereby causing the HMD 200 to perform a process for stepwisely displaying a part of the virtual reality space in which the generation of the basic display data has been completed.

Figure 4:
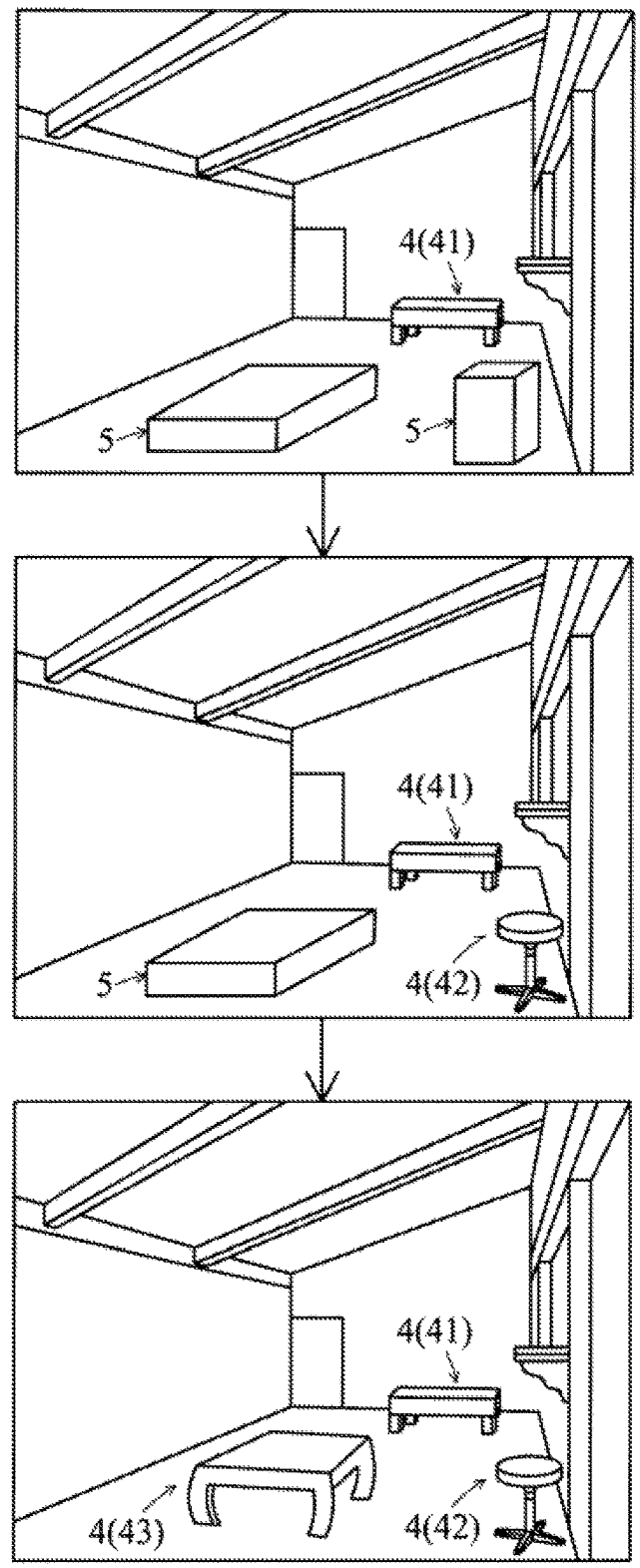
FIG. 4 is a diagram illustrating a virtual reality space displayed by a display apparatus of a display system according to an embodiment.

Hereinafter, a description will be provided for the case where a virtual reality space illustrated at the lowermost portion of FIG. 4 is displayed on the HMD 200. In FIG. 4, a numerical number 4 is given to a basic object such as furniture.

Firstly, the multifunctional peripheral control unit 150 performs a process for combining the basic data D1 and the object data D2 of a basic object 4 (41) with each other to generate basic display data (hereinafter, referred to as first data), and transmits the first data to the HMD 200. In this way, in the HMD 200, display of a virtual reality space illustrated at the uppermost portion of FIG. 4 is performed.

Next, the multifunctional peripheral control unit 150 performs a process for combining the first data and the object data D2 of a basic object 4 (42) with each other to generate basic display data (hereinafter, referred to as second data), and transmits the second data to the HMD 200. In this way, in the HMD 200, display of a virtual reality space illustrated at an intermediate portion of FIG. 4 is performed.

Next, the multifunctional peripheral control unit 150 performs a process for combining the second data and the object data D2 of a basic object 4 (43) with each other to generate basic display data (hereinafter, referred to as third data), and transmits the third data to the HMD 200. In this way, in the HMD 200, display of a virtual reality space illustrated at the lowermost portion of FIG. 4 is performed. That is, a virtual reality space with all the arranged basic objects 41 to 43 is displayed on the HMD 200.

In addition, the HMD 200 displays dummy information 5 on a part of the virtual reality space, in which the generation of the basic display data has not been completed. The display mode (a shape, a color and the like) of the dummy information 5 is not particularly limited. For example, a text character of "Dummy" may be displayed.

Returning to FIG. 3, in the case of causing the HMD 200 to perform the process of stepwisely displaying the part of the virtual reality space, in which the generation of the basic display data has been completed, the flow proceeds to step 5 from step 4.

In step 5, the multifunctional peripheral control unit 150 determines whether the generation of the basic display data has been completed. That is, the multifunctional peripheral control unit 150 determines whether all the basic objects to be displayed in the virtual reality space have been displayed. As a consequence, the multifunctional peripheral control unit 150 determines that the generation of the basic display data has been completed, the present flow is ended, and the multifunctional peripheral control unit 150 determines that the generation of the basic display data has not been completed, the flow proceeds to step 3.

<Acceptance of Editing>

When displaying a virtual reality space, the HMD 200 accepts an editing operation for editing a virtual reality space being currently displayed. By this editing operation, it is possible to change (replace) an object in the virtual reality space being currently displayed. Alternatively, deletion, addition, movement and the like of the object may be performed.

In addition, the HMD control unit 250 detects a gesture of a user by using the imaging unit 220, and when a gesture decided in advance is detected, the HMD control unit 250 recognizes the detected gesture as an editing operation. Alternatively, when detecting that an operation decided in advance has been performed for the operating unit 230, the HMD control unit 250 recognizes the detected operation as an editing operation.

For example, when detecting that a designation operation being a detailed operation of an editing operation, (an operation for designating an object of a change source) has been performed, the HMD control unit 250 displays, as an option, information (for example, a thumbnail of an object) indicating an object which may be a change destination. Then, when detecting that a selection operation (a detailed operation of an editing operation, an operation for selecting an object of a change destination) has been performed, the HMD control unit 250 generates editing content information (information indicating editing content) respectively indicating the objects of the change source and the change destination and transmits the editing content information to the multifunctional peripheral 100.

Figure 5:
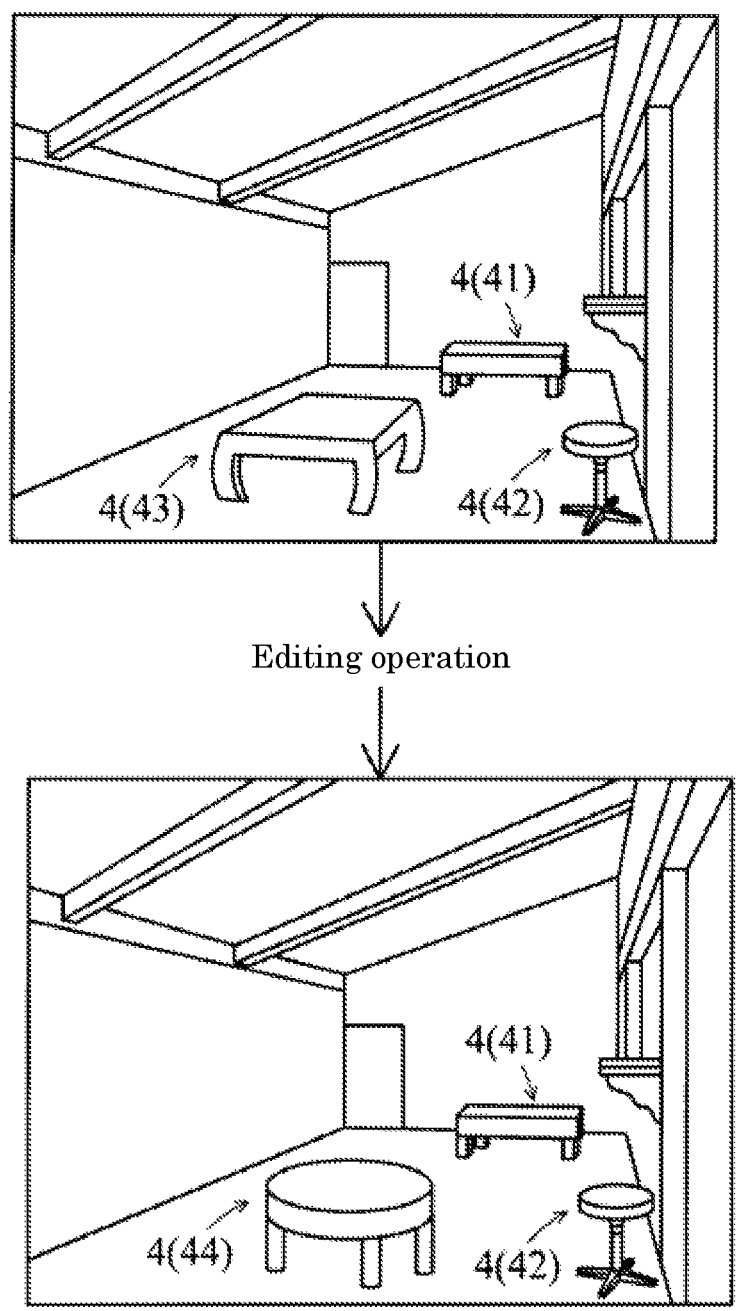
FIG. 5 is a diagram (a diagram before and after an editing operation is performed) illustrating a virtual reality space displayed by a display apparatus of a display system according to an embodiment.

When the editing content information is received from the HMD 200, the multifunctional peripheral control unit 150 recognizes the editing content on the basis of the editing content information, and generates display data for displaying a virtual reality space (a virtual reality space where the object of the change source has been replaced with the object of the change destination) reflecting the recognized editing content as edited display data. Then, the multifunctional peripheral control unit 150 transmits the edited display data to the HMD 200, thereby causing the HMD 200 to display the virtual reality space based on the edited display data. In this way, for example, as illustrated in FIG. 5, the basic object 4 (43) arranged in the virtual reality space is replaced with a separate basic object 4 (44). In this example, the basic object 43 is a change source and the basic object 44 is a change destination.

When the edited display data has been generated, the multifunctional peripheral control unit 150 causes the edited display data to be stored in the server 300 (see FIG. 1). In the following description, a reference numeral ED is given to the edited display data. In this case, the multifunctional peripheral control unit 150 sets data identification information for identifying the edited display data ED and correlates the edited display data ED and the data identification information with each other.

Figure 6:
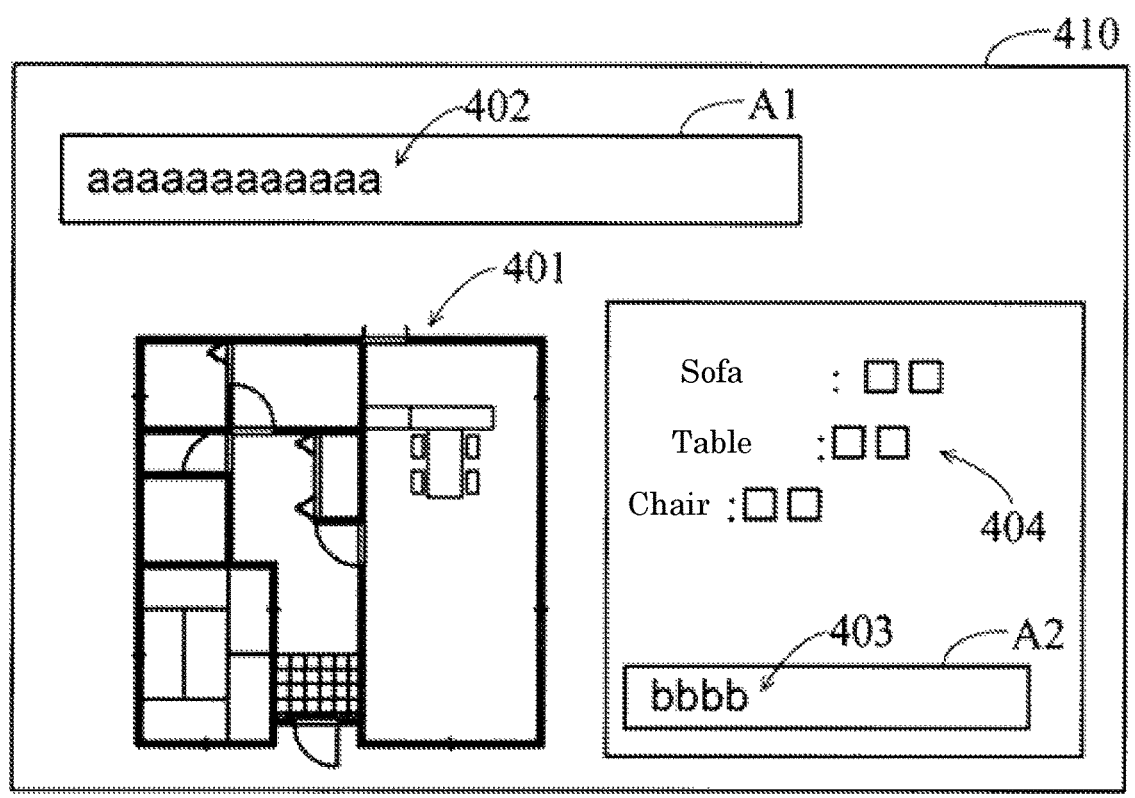
FIG. 6 is a diagram illustrating an edited display data acquisition sheet printed and read by an image forming apparatus of a display system according to an embodiment.

Moreover, the multifunctional peripheral control unit 150 causes the printing unit 120 to print an edited display data acquisition sheet 410 as illustrated in FIG. 6. For example, print data for printing the edited display data acquisition sheet 410 is generated on the basis of image data of the data acquisition sheet 400 (see FIG. 2) read at the time of display of the virtual reality space being currently displayed.

The edited display data acquisition sheet 410 is further provided with an area A2. In the area A2 of the edited display data acquisition sheet 410, an information image 403 (indicated by an enumeration of an alphabet "b" in FIG. 6 for the purpose of convenience) indicating data identification information is printed. In addition, object information 404 on the object arranged in the virtual reality space being currently displayed may be printed on the edited display data acquisition sheet 410. Into "□□" in the object information 404 illustrated in FIG. 6, for example, a text for specifying furniture, such as a manufacture name, a product name, and a model of the furniture (an object), is inserted.

Figure 7:
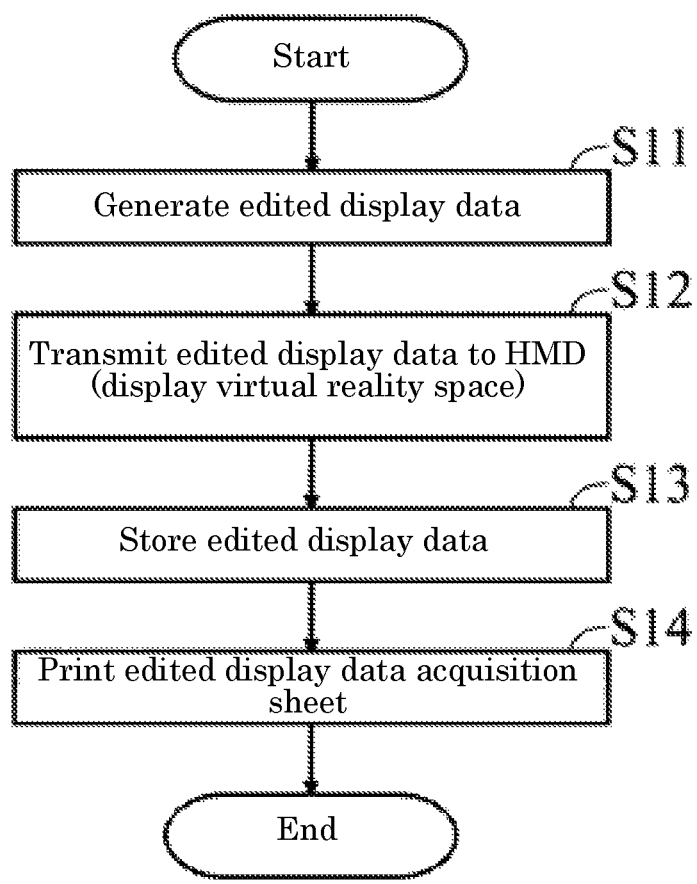
FIG. 7 is a flowchart illustrating the flow of processing when a display system according to an embodiment accepts an editing operation.

Hereinafter, with reference to the flowchart of FIG. 7, the flow of processing when accepting the editing operation will be described. The flowchart illustrated in FIG. 7 is started when the HMD 200 accepts the editing operation and transmits the editing content information to the multifunctional peripheral 100.

In step S11, the multifunctional peripheral control unit 150 recognizes editing content on the basis of the editing content information, and generates the edited display data ED for displaying the virtual reality space reflecting the recognized editing content. Then, in step S12, the multifunctional peripheral control unit 150 transmits the edited display data ED to the HMD 200, thereby causing the HMD 200 to display the virtual reality space based on the edited display data ED.

In step S13, the multifunctional peripheral control unit 150 correlates the edited display data ED and the data identification information with each other, and causes the edited display data ED to be stored in the server 300. In step S14, the multifunctional peripheral control unit 150 causes the printing unit 120 to print the edited display data acquisition sheet 410.

After the edited display data acquisition sheet 410 is printed by the multifunctional peripheral 100, when the multifunctional peripheral 100 is caused to read the edited display data acquisition sheet 410 (when the data identification information is inputted to the multifunctional peripheral 100), it is possible to cause the HMD 200 to display the virtual reality space based on the edited display data ED.

Figure 8:
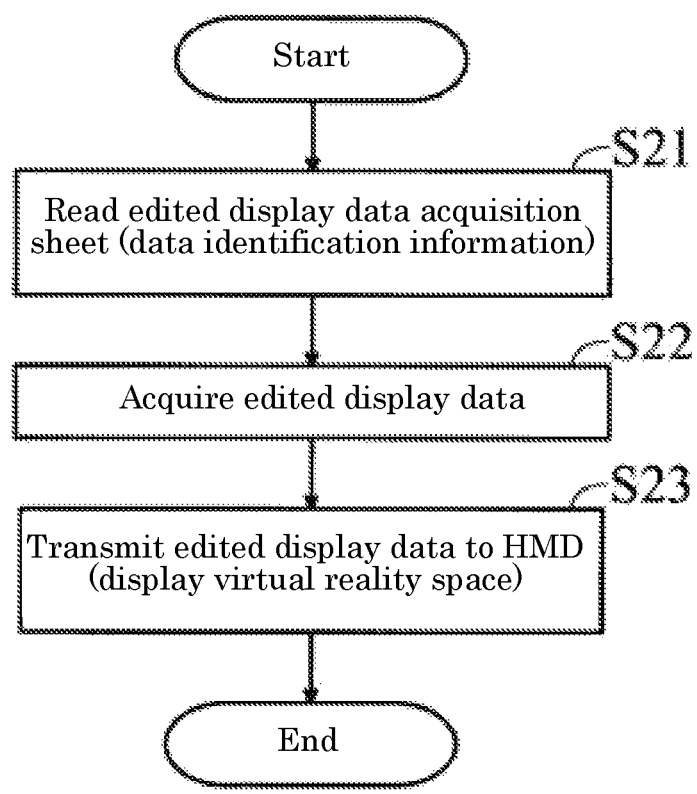
FIG. 8 is a flowchart illustrating the flow of processing when a display system according to an embodiment displays a virtual reality space based on edited display data.

Hereinafter, the above will be described in detail with reference to the flowchart illustrated in FIG. 8. The flowchart illustrated in FIG. 8 is started when the multifunctional peripheral 100 accepts a reading start instruction of the edited display data acquisition sheet 410.

In step S21, the multifunctional peripheral control unit 150 causes the image reading unit 110 to read the edited display data acquisition sheet 410 (data identification information). Then, the multifunctional peripheral control unit 150 performs a character recognition process for the area A2 of image data (read data) of the edited display data acquisition sheet 410 to recognize the data identification information, and deals the recognized data identification information as the data identification information inputted to the multifunctional peripheral 100.

In addition, the operation display unit 130 may accept the input of the data identification information. That is, the data identification information may be inputted to the multifunctional peripheral 100 via the operation display unit 130.

Subsequently, in step S22, the multifunctional peripheral control unit 150 acquires the edited display data ED corresponding to the data identification information from the server 300. In step S23, the multifunctional peripheral control unit 150 transmits the edited display data ED to the HMD 200, thereby causing the HMD 200 to display a virtual reality space based on the edited display data ED.

In the display system 1000 of the present embodiment, when editing is performed for a virtual reality space being currently displayed on the HMD 200, the edited display data ED for displaying the edited virtual reality space is generated and a virtual reality space based on the edited display data ED is displayed on the HMD 200. Furthermore, the edited display data ED is stored in the server 300. Thereafter, when the edited virtual reality space is displayed on the HMD 200 again, the edited display data ED stored in the server 300 is used. In this case, the combination process and the like by the multifunctional peripheral 100 is not performed. Therefore, when a user desires to display the edited virtual reality space again, it is possible to quickly provide the user with the edited virtual reality space. That is, a waiting time until a virtual reality space is displayed is shortened.

Furthermore, in the present embodiment, as described above, the multifunctional peripheral 100 is only caused to read the edited display data acquisition sheet 410, so that it is possible to display the edited virtual reality space, resulting in the improvement of user's convenience.

Furthermore, in the present embodiment, as described above, a completely generated data part of display data for displaying a virtual reality space is stepwisely transmitted to the HMD 200, and a part of the virtual reality space, in which the generation of display data has been completed, is stepwisely displayed to the HMD 200. In this way, a part of a virtual reality space desired by a user, in which the generation of display data has been completed, can be quickly provided to the user. That is, a waiting time until a virtual reality space is displayed is shortened.

Furthermore, in the present embodiment, as described above, the dummy information 5 is displayed on a part of the virtual reality space, in which the generation of the display data has not been completed, so that a user can be notified of whether the generation of the display data for displaying the virtual reality space has been completed.

It is noted that the embodiment disclosed herein is illustrative in all respects and is not restrictive. The technical scope of the present disclosure is defined by the scope of the appended claims rather than the description of the aforementioned embodiment, and is intended to include all modifications within the meaning and scope equivalent to the scope of the appended claims.

For example, in the aforementioned embodiment, a virtual reality space corresponding to an indoor space of a building is displayed; however, the technology of the present disclosure can also be applied to a case of displaying a virtual reality space corresponding to an indoor space, other than a building, such as an indoor space of a vehicle.

Furthermore, in the aforementioned embodiment, the HMD 200 is used as a "display apparatus"; however, a projector and the like may also be used as the "display apparatus".

Furthermore, in the aforementioned embodiment, the basic identification information and the data identification information are read by the multifunctional peripheral 100; however, the basic identification information and the data identification information may also be read by the HMD 200 (the imaging unit 220). In this case, the information read by the HMD 200 is transmitted from the HMD 200 to the multifunctional peripheral 100.

What is claimed is:

1. A display system comprising:
a storage apparatus that stores basic data for displaying a virtual reality space and stores object data for displaying an object in the virtual reality space;
an image forming apparatus that performs a combination process for combining the basic data and the object data with each other, thereby generating display data for displaying the virtual reality space where the object is arranged; and
a display apparatus that receives the display data transmitted from the image forming apparatus and displays the virtual reality space based on the display data,
wherein when the virtual reality space is displayed, the display apparatus accepts editing of the virtual reality space being currently displayed and transmits editing content information indicating accepted editing content to the image forming apparatus,
the image forming apparatus recognizes the editing content on a basis of the editing content information, generates edited display data being the display data for displaying the virtual reality space reflecting the editing content, transmits the edited display data to the display apparatus to cause the display apparatus to display the virtual reality space based on the edited display data, and correlates the edited display data with data identification information for identifying the edited display data to cause the storage apparatus to store the edited display data,
when the data identification information is inputted to the image forming apparatus, the image forming apparatus acquires the edited display data corresponding to the data identification information from the storage apparatus, and transmits the edited display data to the display apparatus to cause the display apparatus to display the virtual reality space based on the edited display data,
the image forming apparatus includes a printing unit for printing an image, and causes the printing unit to print an image indicating the data identification information on a recording medium, and
the image forming apparatus includes an image reading unit for reading an image, causes the image reading unit to read the image indicating the data identification information printed on the recording medium, recognizes the data identification information on a basis of image data obtained by reading of the image reading unit, and acquires the edited display data corresponding to the recognized data identification information from the storage apparatus as the edited display data to be transmitted to the display apparatus.

2. A display system comprising:
a storage apparatus that stores basic data for displaying a virtual reality space and stores object data for displaying an object in the virtual reality space;
an image forming apparatus that performs a combination process for combining the basic data and the object data with each other, thereby generating display data for displaying the virtual reality space where the object is arranged; and
a display apparatus that receives the display data transmitted from the image forming apparatus and displays the virtual reality space based on the display data,
wherein when the virtual reality space is displayed, the display apparatus accepts editing of the virtual reality space being currently displayed and transmits editing content information indicating accepted editing content to the image forming apparatus,
the image forming apparatus recognizes the editing content on a basis of the editing content information, generates edited display data being the display data for displaying the virtual reality space reflecting the editing content, transmits the edited display data to the display apparatus to cause the display apparatus to display the virtual reality space based on the edited display data, and correlates the edited display data with data identification information for identifying the edited display data to cause the storage apparatus to store the edited display data,
when the data identification information is inputted to the image forming apparatus, the image forming apparatus acquires the edited display data corresponding to the data identification information from the storage apparatus, and transmits the edited display data to the display apparatus to cause the display apparatus to display the virtual reality space based on the edited display data, and the image forming apparatus performs a process for partially and sequentially generating the display data as the combination process, and stepwisely transmits a completely generated data part of the display data to the display apparatus, thereby causing the display apparatus to perform a process for stepwisely displaying a part of the virtual reality space, in which generation of the display data has been completed.

3. The display system of claim 2, wherein the display apparatus displays dummy information in a part of the virtual reality space, in which the generation of the display data has not been completed.

4. A display system comprising:

a storage apparatus that stores basic data for displaying a virtual reality space and stores object data for displaying an object in the virtual reality space;

an image forming apparatus that performs a combination process for combining the basic data and the object data with each other, thereby generating display data for displaying the virtual reality space where the object is arranged; and a display apparatus that receives the display data transmitted from the image forming apparatus and displays the virtual reality space based on the display data, wherein the image forming apparatus performs a process for partially and sequentially generating the display data as the combination process and stepwisely transmits a completely generated data part of the display data to the display apparatus, thereby causing the display apparatus to perform a process for stepwisely displaying a part of the virtual reality space, in which generation of the display data has been completed.

5. The display system of claim 4, wherein the display apparatus displays dummy information in a part of the virtual reality space, in which the generation of the display data has not been completed.

* * * * *